(12) United States Patent
Badilla Ohlbaum et al.

(10) Patent No.: US 7,915,031 B2
(45) Date of Patent: Mar. 29, 2011

(54) DNA FRAGMENTS ARRAY FROM BIOMINING MICROORGANISMS AND METHOD FOR DETECTION OF THEM

(75) Inventors: Ricardo Badilla Ohlbaum, La Reina (CL); Alejandro Eduardo Maass Sepúlveda, Peñalolén (CL); Pilar Angélica Parada Valdecantos, Nuñoa (CL); Andrés Octavio Aravena Duarte, Nuñoa (CL); Mauricio Alejandro Gonzalez Canales, Peñalolén (CL); Servet Martinez Aguilera, La Cisterna (CL); Katia Nicole Ehrenfeld Stolzenbach, Las Condes (CL); Pablo Andrés Moreno Cortés, Lo Barnechea (CL)

(73) Assignee: Biosigma S.A., Colina (CL)

( * ) Notice: Subject to any disclaimer, the term of this patent is extended or adjusted under 35 U.S.C. 154(b) by 223 days.

(21) Appl. No.: 11/601,516

(22) Filed: Nov. 17, 2006

(65) Prior Publication Data
US 2008/0207462 A1 Aug. 28, 2008
US 2009/0054249 A2 Feb. 26, 2009

(30) Foreign Application Priority Data

Nov. 21, 2005 (CL) .............................. CL 3033-2005

(51) Int. Cl.
*C12M 1/34* (2006.01)
*C07H 21/04* (2006.01)

(52) U.S. Cl. .................. 435/287.2; 536/23.1; 536/24.32
(58) Field of Classification Search .................. None
See application file for complete search history.

(56) References Cited

U.S. PATENT DOCUMENTS
2002/0187476 A1* 12/2002 Koroulis et al. .................. 435/6

OTHER PUBLICATIONS

Schena et al. "Microarrays: biotechnology's discovery platform for functional genomics." *Trends in Biotechnology*.
Rawlings, "Characteristics and adaptability of iron-and sulfur-oxidizing microorganisms used for recovery of metals from minerals and their concentrates." *Microbial Cell Factories* vol. 4, No. 13. 2005. pp. 2-34.
Ye et al. "Applications of DNA microarrays in microbial systems." *Journal of Microbiological Methods* vol. 47. 2001. pp. 257-272.
Rawlings. "Heavy Metal Mining Using Microbes." *Annu. Rev. Microbiol.* vol. 56. 2002. pp. 65-91.

* cited by examiner

*Primary Examiner* — Bradley L Sisson
(74) *Attorney, Agent, or Firm* — Merchant & Gould P.C.

(57) ABSTRACT

The present invention discloses an array of DNA fragments from biomining microorganisms and a method to identify readily and simultaneously said microorganisms in a sample. This method is a useful tool in biomining, in every circumstance where a global understanding of the present microbiological diversity is required, or simply to assess the presence of some microorganism with biomining relevance, either on the mineral, or in a bioleaching heap, in the biomining laboratory or in any other circumstance involving biomining microorgarisms.

4 Claims, 2 Drawing Sheets

DNA FRAGMENTS ARRAY FROM BIOMINING MICROORGANISMS AND METHOD FOR DETECTION OF THEM

FIELD OF THE INVENTION

The present invention discloses a biomining microorganism DNA fragment array and a method to identify said biomining microorganisms in a sample readily and simultaneously. This method is a useful tool in biomining, in every circumstance where a global understanding of the present microbiological diversity is required, or simply to assess the presence of some microorganism with biomining relevance, either on the mineral, or in a bioleaching heap, in the biomining laboratory or in any other circumstance involving biomining microorganisms.

BACKGROUND OF THE INVENTION

Biomining is, in general terms, the use of microorganisms for the recovery of metals from minerals. Its most traditional expression is bioleaching, but we understand biomining as encompassing not only this process, but also the monitoring and intervention of the involved microorganisms, as these techniques are complex and subjected to permanent development; laboratory level research associated to the improvement of processes or the development of new methodologies are also included.

Bioleaching is defined as a method to solubilize metals from complex matrixes in an acid medium using direct or indirect microorganism action. Microorganisms that are useful in these processes belong both to Bacteria and Archaea domains and fulfill two basic conditions: they are acidophiles and chemolithotrophic.

Microorganisms Associated with Bioleaching Processes.

Many microorganisms have been described as being useful in bioleaching processes, among which we can identify genera *Acidiphilium* spp., *Leptospirillum* spp., *Sulfobacillus* spp., *Acidithiobacillus* spp. and species *Acidithiobacillus ferrooxidans* and *Acidithiobacillus thiooxidans* belonging to Bacteria domain. From Archaea domain we can identify genera *Acidianus* spp., *Ferroplasma* spp., *Metallosphaera* spp., *Sulfolobus* spp. and *Thermoplasma* spp. (Rawlings D E. Annu Rev Microbiol. 2002; 56:65-91; Rawlings D E. Microb Cell Fact. 2005; 4(1):13).

Factors Determining Diversity and Metabolic Activity of the Microbiological Community Associated to Bioleaching Processes.

The microorganisms belonging to each above mentioned genus and species produce compounds that increase the rate of different chemical reactions, which allows carrying out bioleaching processes in much shorter times. For this, microorganisms require in their turn a suitable environment to promote said reactions that, for instance, could be aerobic or anaerobic, or require some specific nutrient. Therefore, the environmental conditions under which the bioleaching process is carried out modify the activity and microbiological composition of the present community.

It has been proposed that microorganism participation in bioleaching processes could be direct or indirect (Rawlings D E. Microb Cell Fact. 2005; 4(1):13). It is direct when microorganisms act directly over the metal or over its counter-ion, in either case releasing one ion of the desired metal. On the other hand, the participation is indirect when the microorganism does not use the desired metal or its counter-ion as a substrate, but generates chemical conditions that accelerate or favor said metal solubilization, either by acidification of the medium (e.g., by generating sulfuric acid) or by generating an oxidizing agent that finally interacts with the salt (metal and counter-ion) to be solubilized. For instance, species belonging to genus *Acidithiobacillus* are able to produce elements that increase the oxidation rate of reduced sulfur compounds (such as sulfide, elemental sulfur, thionates, etc.) by using oxygen as electron acceptor. During this process they generate sulfuric acid as final product and reducing species such as sulfite and thiosulfate as intermediate products, which allows solubilizing sulfur associated metals in the mineral. In particular, *Acidithiobacillus ferrooxidans* and *Leptospirillum ferrooxidans* contribute with biological components that favor iron (II) to iron (III) oxidation using oxygen as electron acceptor. Generated iron (III) is a major oxidizing agent that can oxidize present sulfides or any other compound to be oxidized.

The common mining practice in bioleaching processes is to leave a heap of mineral in an acid medium, generally sulfuric acid, and gradually remove the acid medium to recover the metal by electrolysis. Often efficient metal recovery yield heaps and "inefficient" heaps are obtained, these latter having a lower yield under the same operation conditions and characteristics of the leached substrate. Being bioleaching a microbiological process, differences of efficiency levels between heaps could be consequence of differences in abundance and type of species in the microbiological community composing them. In this way, this low yield problem could be solved, for example, by inoculating microorganisms that produce components favoring the desired reaction to be maintained during the process. Nevertheless, up to date there is no method allowing the fast, specific and simultaneous identification of bioleaching microorganisms present in a sample.

Microorganisms Detection Method.

According to the state of the art, if it would be desired to determine the major components of a microbiological population with biomining relevance that are present in a sample, it could be done using techniques such as: denaturing gradient gel electrophoresis (DGGE), fluorescence in situ hybridization (FISH), polymerase chain reaction (PCR), or selective cultures. These techniques are labor intensive, expensive and require highly qualified workers to perform them. For example, DGGE assay is slow, its completion taking about 3 weeks, and have low sensitivity (detection limit: $10^4$ microorganisms/ml), which is inadequate for biomining communities, as normally there are relevant taxons at lower concentrations than said detection limit. PCR technique also has problems, requiring firstly an individual reaction for each of the species to be determined, which is slow and extremely laborious. In second place, when working with a metagenomic sample, there is the risk of primers having cross-reactivity with other of the species found in the sample, giving both false positive and false negative results. Finally, analysis of microbiological communities using the traditional identification method by culturing has the risk of some species that are present in lower proportion being lost in the process and not being detected. This risk is always present in the case of selective cultures, but is increased when dealing with biomining microorganisms, as the conditions that maintain the growth of these microorganisms are hard to achieve, and some of them are definitely not even able to be cultured in the laboratory. Other problem of the analysis by culture is the slow development of the process, which could take many days.

In consequence, in the state of the art there is no simultaneous detection method for many organisms that is simultaneously fast, specific and cheap.

By mean of the present invention said technical problem has been solved by creating a simultaneous identification method for biomining microorganisms using a DNA fragment array technique.

A good definition of DNA array is that proposed by Schena et al. (Trends Biotechnol. 16, 301-306): "a microscopic ordered nucleic acid array that allows simultaneous analysis of complex DNA samples" (Schena M., Heller, R. A., Theriault, P., Konrad, K., Lachenmeier, E. and Davis, R. W. (1998)). Depending on the diameter of the deposited DNA spots, there are 2 array types: macro-arrays (300 microns or more) and micro-arrays (less than 100 microns). The first can be manually manufactured in the laboratory and the spots can be observed without the help of special equipment. The second require an automated deposition process (normally a robotic deposition platform) and a specialized image acquisition and processing equipment.

In this particular case, DNA fragment arrays comprise an ordered series of spots deposited on a flat surface, such as a glass, silicon or nylon sheet, where every spot contains a large amount of copies of a known DNA fragment that is specific for a determined microorganism with biomining relevance.

The selection method using DNA fragment arrays comprise a simultaneous hybridization of the set of array "spots" with a labeled DNA extract of the studied sample. Normally, DNA from the sample, which has been labeled and fragmented as required, is subjected to a denaturation stage wherein the double stranded DNA is separated, e.g. by heating. When temperature is lowered, DNA will tend to hybridizes with its most complementary fragment according to its physicochemical characteristics. Being this DNA in contact with the array, if there is coincidence between sample DNA and the DNA fragment contained in a spot, labeled sample DNA copies will specifically attach to said spot with the largest possibility. This is due to the larger amount of complementary DNA copies contained in the array spot. In the acquisition and processing stage of the hybridized array image, this label will allow the detection of the microorganisms present in the studied sample.

DNA labeling can be done by any known labeling technique, being fluorescence and radioactive labeling the most common ones.

Arrays and their usage method are known, and we find examples of arrays in the state of the art used to detect the presence of microorganisms in a sample, but none of them is directed to microorganisms that are relevant in biomining.

At the present time, diverse published protocols exist for the manufacture of DNA fragment arrays, and there are also laboratories that offer manufacturing services for this type of arrays. Consequently, only the selection of genes and the design of used DNA fragments defines the specificity and utility of an array, as the manufacture can vary according to the matrix, the method used to bind DNA fragments to the matrix, the spatial distribution of the spots on the matrix, etc., depending on the manufacturing company or the protocol used to manufacture the array in the laboratory (Ye et al. Journal of Microbiological Methods 47 (2001): 257-272).

BRIEF DESCRIPTION OF THE INVENTION

The present invention discloses a DNA fragment array from biomining microorganisms and a method to readily and simultaneously identify said biomining microorganisms in a sample.

We have designed DNA fragments comprising 100 or less nitrogenous bases that allow the specific and unequivocal identification of the following taxons having biomining importance: bacteria *Acidiphilium* spp., *Leptospirillum* spp., *Sulfolobus* spp., *Acidithiobacillus ferrooxidans* and *Acidithiobacillus thiooxidans*; and archaea *Acidianus* spp., *Ferroplasma* spp., *Metallosphaera* spp., *Sulfobacillus* spp. and *Thermoplasma* spp. Moreover, we have included sequences for the detection of strain Wenelen (DSM 16786), owned by Biosigma, which can be conveniently included in biomining processes.

By disposing at least one of these DNA fragments in an array, the presence of at least one biomining relevant microorganism can be detected and identified. Preferentially, arrays containing many of the designed DNA fragments are provided, which allows the simultaneous identification of many or all the biomining relevant microorganisms in a sample by using a single process.

Preferably, a sufficient number of different DNA fragments are included in the arrays to detect all the biomining relevant microorganisms in a sample.

Conclusion: The results indicate the presence of *A. ferrooxidans, Leptospirillum* spp., and *Ferroplasma* spp. in sample 1 (M1). Data indicate that correlation always existed between spots with 16S rDNA fragments and spots with tRNA-synthases. All positive controls showed a hybridization signal and negative controls remained unmarked.

Figure 2:

FIG. 2 shows the result of hybridizing a second biomining sample with a microarray of the invention. The used microarray is the same used for sample 1, the content of which is described in Table 1. The fragments used in the example are contained in the sequences for 16S rDNA and tRNA-synthases described in Table 2. Each fragment was deposited by triplicate.

Conclusion: The results indicate the presence of *A. ferrooxidans, A. thiooxidans, Acidianus* spp., *Leptospirillum* spp., *Ferroplasma* spp., *Metallosphaera* spp. and *Sulfolobus* spp. in sample 2 (M2). Data indicate that correlation always existed between spots with 16S rDNA fragments and spots with tRNA-synthases. All positive controls showed a hybridization signal and negative controls remained unmarked.

DETAILED DESCRIPTION OF THE INVENTION

A method that allows fast and simultaneous detection and identification of biomining microorganisms would have applications in diverse industrial areas. As an example, the identification of microorganisms present in a bioleaching heap could become a tool to appropriately control the bioleaching process, as it could be established whether it is necessary to inoculate some particular microorganism into the heap or not, thus maximizing the amount of mineral recovered in the process.

With our resources put in the former objective, we have designed DNA fragments useful to detect and identify the different microorganisms relevant in biomining by disposing them in a DNA array. These microorganisms relevant in biomining are bacteria *Acidiphilium* spp., *Leptospirillum* spp., *Sulfolobus* spp., *Acidithiobacillus ferrooxidans* and *Acidithiobacillus thiooxidans*; archaea *Acidianus* spp., *Fer-*

*roplasma* spp., *Metallosphaera* spp., *Sulfobacillus* spp. and *Thermoplasma* spp.; and strain Wenelen (DSM 16786).

The strain Wenelen (DSM 16786), owned by Biosigma, has an increased oxidizing activity, especially in the case of chalcopyrite, in comparison with other known microorganisms. This feature makes its incorporation in biomining processes convenient and the arrays of the present invention would allow monitoring its presence in the media where it has been inoculated.

All DNA arrays base their detection capacity on the DNA fragments designed to be synthesized and bound onto a solid substrate. These DNA fragments, short nucleotide sequences having 300 or less nitrogenous bases in our case, are designed from specific genomic sequences of the microorganisms to be detected. Therefore, the first step is choosing the genes, regions or sequences of the genomes of the desired microorganisms from which the deposited fragments will be selected.

For a greater convenience in the design of DNA fragments and eventually in the use of the array, a limited genomic region can be selected, which has to be conserved in all the relevant genomes, i.e. have to be present in all the relevant microorganisms. Furthermore, said region must be variable enough (in its nucleotide sequence) to allow distinguishing between different species and even between different strains in case it should be required.

An advantage of using a genomic region is given by the fact that the array can be used in conjunction with the product of a PCR that universally amplifies the selected region, which eventually could increase the sensitivity of the method.

Advantageously, in a microorganism identification array many different spots that identify the same microorganism are included, which assures that the user could be more trustful on obtained data. In this way, each point set identifying a particular microorganism acts as an internal control by itself for "false positives" or "false negatives" generated by interferences during the course of the method.

We have opted to include both strategies in our arrays. In one hand, we work with the same genomic region for every microorganism to be identified, taking into account that arrays can be eventually provided only with this set of spots. On the other hand, we have also included many genomic regions of the same microorganism, and in this way the whole array, which contains all the DNA fragments designed by us, will contain a set of spots for the identification of each biomining microorganism.

The first gene selected by us is the gene codifying for the 16S ribosomal RNA molecule, herein referred as 16S rDNA, traditionally used for identification. The other selected characteristic genomic regions are genes codifying for different tRNA-synthases, which are represented in substantially all microorganisms due to their relevance. These genes have the required conservation and variability features that are adequate to identify microorganisms, as set forth above.

Once these regions were selected, DNA fragments having 100 nitrogenous bases were designed, each one specific for each of the microorganisms to be identified in the process, i.e. for bacteria *Acidiphilium* spp., *Leptospirillum* spp., *Sulfobacillus* spp., *Acidithiobacillus* spp., *Acidithiobacillus ferrooxidans* and *Acidithiobacillus thiooxidans*; archaea *Acidianus* spp., *Ferroplasma* spp., *Metallosphaera* spp., *Sulfolobus* spp. and *Thermoplasma* spp.; and strain Wenelen (DSM 16786).

The designed fragments can be deposited on the array either entire, or comprised in a larger fragment that contains them, or in partial form, i.e. as any of the sub-fragments comprised in the fragment, or as the reverse complementary sequences of any of the former options. Advantageously, sub-fragments having 50 or 70 nucleotides were deposited.

DNA fragment design was carried out using a proprietary method protected by patent application CL 2102-05, filed by Biosigma. Said method is applied in the oligonucleotide design software "Massive Primer Designer". For more clarity, we will briefly explain the method.

A database was selected, SHIFTSIXTEEN©, which contains all sequences from the selected genomic regions for all taxons or strains to be determined. In this first stage, we will refer to nucleotide sequences as words having defined length in the alphabet {A,C,T,G}. Each sequence is computationally scanned from 5' to 3' to obtain all existing words that have the defined length for desired DNA fragments to be designed, 100 in this case. This oligonucleotide candidate pass through the following tests in the same described order, wherein a rejection in one of the tests means the total rejection of the candidate.

1. GC composition level: This is a filter that allows discarding a priori candidates that have very high or very low hybridization temperature values, by performing very cheap calculations in terms of time. The candidate is rejected if its GC composition falls off the limits imposed at the moment of executing the calculation.
2. Hybridization temperature: Given a sequence and environmental conditions (salt concentration, nucleotide concentration, etc.), the hybridization temperature between said sequence and its complementary one is calculated. When executing the calculation, an oligonucleotide is rejected if its hybridization temperature falls off the established limits to be used during the hybridization assay.
3. Secondary structure: for a reference temperature, for each candidate sequence is examined to know whether a stable secondary structure (three-dimensional fold of the oligonucleotide by itself) is formed or not. If a secondary structure is formed, the oligonucleotide is replaced by its reverse complementary sequence; if this reverse complementary also forms a secondary structure, then the oligonucleotide is rejected. If only the original form of the oligonucleotide forms a secondary structure, but not its reverse complementary sequence, then this latter is selected as candidate oligonucleotide for the following tests.
4. Specificity: using one or more sequence alignment algorithms, each candidate is tested for relevant similarity with sequences pertaining to other microorganisms that can probably be present in a biomining sample.

If all tests were approved, the candidate is selected as possible oligonucleotide to be used as deposited DNA fragment in an array.

In this method some other optimizations are included, such as the initial selection of sequences that are relatively specific for each microorganism, in order to limit the oligonucleotide search in selected regions.

Using this method, a plurality of oligonucleotides was obtained that fulfill all the described requirements and can be used in an array for the detection and identification of biomining relevant microorganisms.

We have designed a total of 70 DNA fragments for the identification of different biomining relevant taxons, each one having 100 nucleotides. The sequences of all designed 70 DNA fragments were included in the listing of sequences.

From all the 70 designed sequences, SEQ ID NO:1 is specific for *Acidiphilium* spp., corresponding to a 16S rDNA gene fragment.

There are 9 specific sequences for *Leptospirillum* spp., SEQ ID NOS:2 to 10, from which SEQ ID NO:2 corresponds to a 16S rDNA sequence and the others (SEQ ID NOS:3 to 10) are fragments of genes codifying for different tRNA-synthases.

One sequence is specific for *Sulfobacillus* spp., SEQ ID NO:11, corresponding to 16S rDNA.

Two sequences are specific for *Acidithiobacillus* spp., namely SEQ ID NOS: 12 and 13. SEQ ID NO:12, corresponding to 16S rDNA, specifically recognizes *Acidithiobacillus* spp. different from species *Acidithiobacillus ferrooxidans* and *Acidithiobacillus thiooxidans*. On the other hand, SEQ ID NO:13, also corresponding to 16S rDNA, is specific for the entire genus.

SEQ ID NOS:14 to 26 recognize the species *Acidithiobacillus ferrooxidans*, where SEQ ID NOS:14 to 17 correspond to 16S rDNA and SEQ ID NOS:18 to 26 correspond to tRNA-synthases.

SEQ ID NO:27 is specific for *Acidithiobacillus thiooxidans* and corresponds to 16S rDNA.

One of the sequences is specific for *Acidianus* spp., SEQ ID NO:28, corresponding to 16S rDNA.

There are 11 sequences that are specific for *Ferroplasma* spp., namely SEQ ID NOS:29 to 39, from which SEQ ID NO:29 corresponds to 16S rDNA and SEQ ID NOS:30 to 39 correspond to tRNA-synthases.

SEQ ID NO:40 is specific for *Metallosphaera* spp. and corresponds to 16S rDNA.

There are 10 sequences that are specific for *Sulfolobus* spp., namely SEQ ID NOS:41 to 50, from which SEQ ID NO:41 corresponds to 16S rDNA and SEQ ID NOS:42 to 50 correspond to tRNA-synthases.

SEQ ID NOS:51 to 59 are specific for *Thermoplasma* spp., from which SEQ ID NO:51 corresponds to 16S rDNA and SEQ ID NOS:52 to 59 correspond to tRNA-synthases.

Finally, there are 11 sequences that are specific for strain Wenelen (DSM 16786), namely SEQ ID NOS:60 to 70, where SEQ ID NO:70 is a tRNA-synthase and SEQ ID NOS: 60 to 69 correspond to specific sequences for the strain.

Apart from these DNA fragments that are specific for each biomining relevant microorganism, it is convenient to include negative and positive controls in each array. Negative controls must be nucleotide sequences that should never be found in a biomining context. Positive controls must be nucleotide sequences that are always present in a test sample.

It should be noted that the arrays disclosed in the present invention are those comprising at least one of the DNA fragments included in SEQ ID NOS:1 to 70, either entirely, or in a larger region comprising them, such as a PCR product, or partially, i.e. as one of the sub-fragments contained in each of the fragments herein disclosed, or as the reverse complementary sequence of any of the former options. This is vitally relevant, as the specificity of a nucleotide sequence is the same specificity of its reverse complementary sequence, and it is this feature, i.e. specificity, the more difficult goal to achieve in the design of DNA fragments. It could be possible that the stability of the reverse complementary sequence will not be suitable for the sequence to be used in an array, but nevertheless the skilled person will distinguish between thermodynamically stable and unstable oligonucleotides by means of diverse tools existing in the art. All reverse complementary sequences of fragments No 1 to 70 of the present invention, either entirely, or in a larger region comprising them, such as a PCR product, or partially, i.e. as one of the sub-fragments contained in each of the fragments herein disclosed, are to be considered within the scope of the present invention.

Preferably, the array will contain at least one fragment or sub-fragment for each biomining relevant species. It is also possible to manufacture an array containing all disclosed DNA fragments or sub-fragments. All these options, together with all the intermediate possible combinations, are comprised within the scope of the present invention.

The efficiency of the arrays of the invention is given by the specificity and stability of the fragments to be deposited. These characteristics are retained by each sub-fragment contained within the designed fragments. This means that specificity is retained if nucleotides 1 to 100, or 42 to 92, or 15 to 65, or any other possible selection is used. All selections are sub-fragments and are comprised within the scope of the present invention.

It is also possible to have DNA fragments that contain fragments or sub-fragments of the invention flanked by other oligonucleotides, either by synthesis or as PCR products. These larger fragments that contain the fragments of the present disclosure, the specificity of said fragments given by the fragments or sub-fragments designed by us, are also to be considered within the scope of the present invention.

Each selected fragment or sub-fragment have to be synthesized in many hundreds of copies and deposited as a homogeneous point on a suitable array support, such as glass, silicone, nylon or other support in the art.

As we mentioned before when discussing the background of the invention, synthesis techniques for DNA fragments and array manufacture are known, and any of them could be used to manufacture the arrays of the present invention.

Use of the Array

For the detection and identification of biomining microorganisms by using the arrays of the present invention, a sample DNA to be evaluated must be firstly isolated. It is also possible to work with cDNA, the only difference being that RNA is firstly isolated from the sample in this case. Many DNA and RNA extraction methods from mineral or soil samples are known in the art and any of them can be used, considering in each case the particular nature of the sample.

In a second stage, the entire sample DNA or RNA must be converted to short labeled fragments, which are suitable for hybridization with the fragments that are deposited in the array spots. In case that sample DNA was isolated, this DNA has to be fragmented and labeled. In case that the study is being carried out using sample RNA, fragmentation is not required and only labeling must be performed to obtain labeled cDNA. A technique that enables to fragment and label DNA at the same time is labeling by using random 6-nucleotide DNA primers. Labeling can be done using labeled nucleotides or the sample can be labeled using any of the other techniques in the art, such as radioactivity, biotin, fluorescence labeling or other. Preferably, if a macroarray is to be used, labeling will be done by using radioactivity, $^{32}$P, and if a microarray is to be used, fluorescence should be preferred, e.g. using Cy5 or Cy3.

Alternatively, if the selected array comprises DNA fragments belonging to a single genomic region, such as e.g. 16S rDNA or methionyl-tRNA-synthase, a PCR amplification stage can be performed using universal primers that contain the selected regions, and directly labeling the PCR product using labeled nucleotides or nucleotides that are able to be labeled.

The methods described for the preparation of DNA or cDNA for the array do not limit the present invention, and any existent method can be used for the preparation of DNA or cDNA without causing the use of the array to be out of the scope of the present invention.

Once the DNA is prepared, it is subjected to a DNA denaturation stage, and subsequently said denatured DNA is incubated on the array by putting an aliquot of the DNA mix on the array. The array is left to hybridize at a suitable temperature for at least one hour, and preferably overnight.

After the hybridization stage, the array must be carefully washed, usually using buffer solutions at moderate temperatures between 35-50° C., preferably between 40-45° C.

Once washed, the array is preferably dried, advantageously by centrifugation, for example in a Falcon tube, for a short time at moderate velocity.

Finally, labeled spots should be visualized, and the position of each labeled point indicates the presence of the biomining microorganism from which the corresponding DNA fragment was designed.

Furthermore, the negative control spots are controlled for absence of signal, as the presence of hybridization with said DNA fragments would indicate an unspecific reaction and therefore the obtained results should be discarded due to the presence of false positives.

Likewise, positive control spots must be marked, as the absence of hybridization with said DNA fragments would indicate interferences in the reaction and therefore those spots without signal could be false negatives.

Consequently, the determination of the composition of a biomining microbiological community would be reduced to the reading of labeled spots in an array of the present invention.

EXAMPLES

Example 1

Microarray to Detect and Identify the Presence of Biomining Relevant Microorganisms A microarray was manufactured having twenty different DNA fragments that specifically identify the 10 most relevant taxons in biomining: *Acidiphilium* spp., *Leptospirillum* spp., *Sulfobacillus* spp., *Acidithiobacillus ferrooxidans*, *Acidithiobacillus thiooxidans*, *Acidianus* spp., *Ferroplasma* spp., *Metallosphaera* spp., *Sulfolobus* spp. and *Thermoplasma* spp.

In all cases, a DNA fragment from the 16S rDNA genomic region was included, and for some taxons two fragments corresponding to different tRNA-synthases were included, in order to have an internal control in these cases. One positive control and three negative controls were also included in the microarray. In the following Table 1, the content of each position in the microarray is detailed.

TABLE 1

| | Position in the microarray | |
|---|---|---|
| Microorganism | 16S rDNA | tRNA-synthase |
| *A. ferrooxidans* | A4-A6 | B7-B9; C7-C9 |
| *A. thiooxidans* | A7-A9 | — |
| *Acidiphilium* spp. | E7-E9 | — |
| *Acidianus* spp. | C1-C3 | — |
| *Leptospirillum* spp. | C4-C6 | C10-C12; E4-E6 |
| *Sulfobacillus* spp. | D4-D6 | — |
| *Ferroplasma* spp. | D1-D3 | E10-E12; D10-D12 |
| *Metallosphaera* spp. | B4-B6 | — |
| *Sulfolobus* spp. | D7-D9 | F4-F6; A10-A12 |
| *Thermoplasma* spp. | E1-E3 | F1-F3; F10-F12 |
| Positive control | | A1-A3 |
| Negative control | | F7-F9; B10-B12; B1-B3 |

All deposited fragments were 60 nucleotides long. Selected DNA fragments of the invention are 60-nucleotide-long sub-fragments of the fragments detailed in Table 2, which are defined in the list of sequences.

TABLE 2

| | tRNA-synthase | | 16S rDNA |
|---|---|---|---|
| Microorganism | Amino-acyl | SEQ ID NO: | SEQ ID NO: |
| *A. ferrooxidans* | Alanyl | 19 | 14 |
| | Leucyl | 26 | — |
| *A. thiooxidans* | — | — | 27 |
| *Acidiphilium* spp. | — | — | 1 |
| *Acidianus* spp. | — | — | 28 |
| *Leptospirillum* spp. | Isoleucyl | 3 | 2 |
| | Alanyl | 6 | — |
| *Sulfobacillus* spp. | — | — | 11 |
| *Ferroplasma* spp. | Threonyl | 37 | 29 |
| | Valyl | 39 | — |
| *Metallosphaera* spp. | — | — | 40 |
| *Sulfolobus* spp. | Glutamyl | 41 | 41 |
| | Alanyl | 43 | — |
| *Thermoplasma* spp. | Isoleucyl | 54 | 51 |
| | Histidyl | 56 | — |

Each fragment was deposited by triplicate. The manufacture of the microarray was carried out by a specialized company in the field.

Example 2

Use of the Microarray to Detect and Identify Biomining Relevant Microorganisms

The microarray obtained in Example 1 was used to determine the composition of the microbiological community of two bioleaching heap effluent samples, sample 1 (M1) and sample 2 (M2).

Total DNA was extracted from M1 and M2 using traditional DNA extraction methods.

2 µl were taken from the DNA samples and put in Eppendorf tubes. In each case, the following method was carried out:

36 µl of ddH$_2$O and 3.3 ml of 6-nucleotide random primers were added. The mix was boiled for 5 minutes and then the work was continued on ice.

2 µl of a nucleotide mix were added, where dUTP was labeled with a Cy fluorophore. Cy3 was used for M1, with green fluorescence, while Cy5 was used for M2, with red fluorescence. Subsequently, 4 µl of a polymerase and 5 µl of buffer solution were added, and the mix was incubated for 4 hours at 37° C.

The reaction was stopped with 5 µl 0.5 M EDTA, pH 8. Labeled DNA was recovered using an ion exchange column. The DNA containing eluate was dried under vacuum.

DNA was resuspended by adding 100 µl of a buffer solution and was brought to 100° C. for one and a half minute, to denature DNA. Hybridization was carried out on the array at 55° C. overnight.

The following morning, each microarray was washed twice with 2×SSC, 0.1% SDS, at 45° C.; once with 0.2×SSC, 0.1% SDS, at 42° C., and once with 0.2×SSC, at 42° C.

Each microarray was put in a case with MilliQ water for 15 minutes and subsequently dried by centrifugation in a Falcon tube for 1 minute at 1100 rpm.

Figure 1:
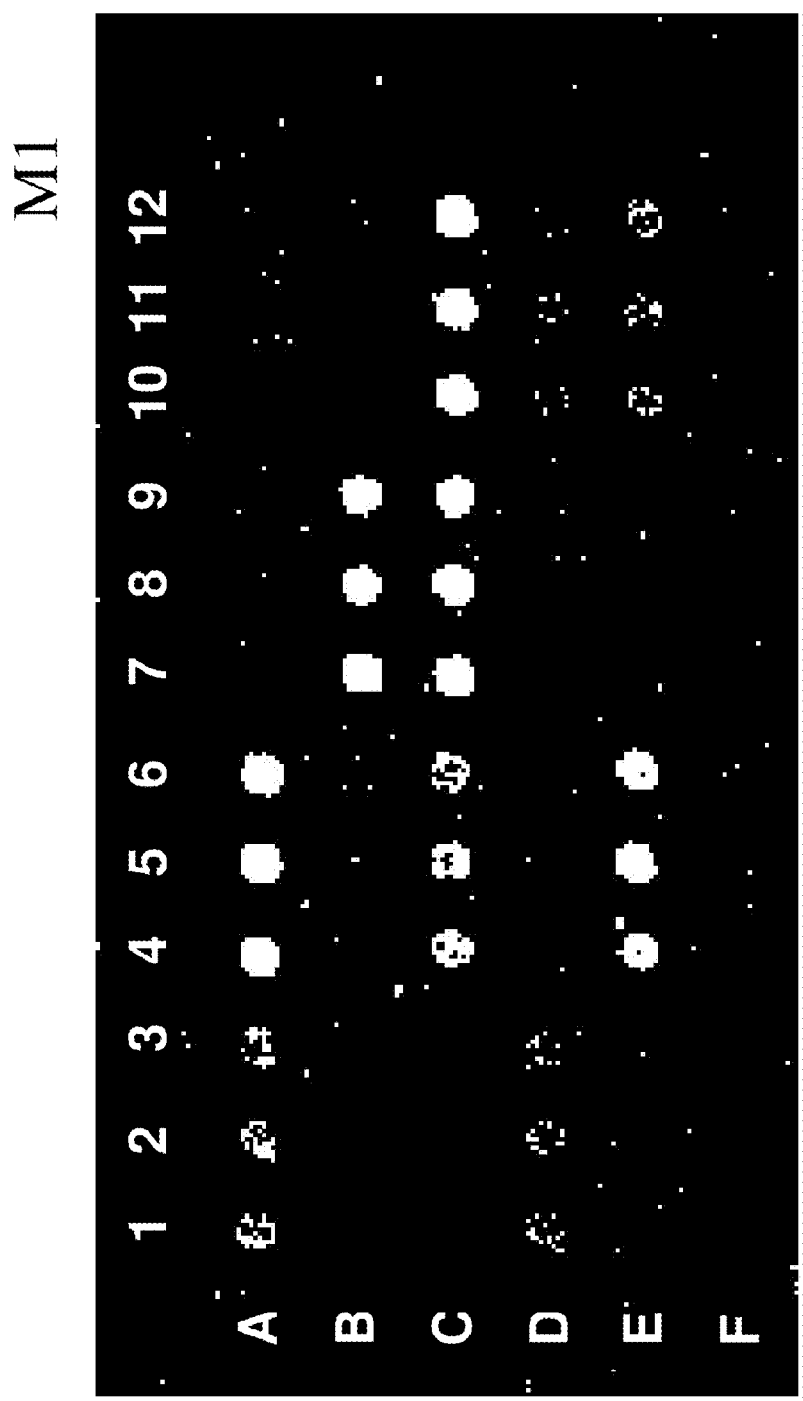
FIG. 1 shows the result of hybridizing a biomining sample 1 with an array of the invention. Fragments of the invention correspond to sub-fragments of fragments of 16S rDNA and tRNA-synthases genes described in Table 2. Each fragment was deposited by triplicate. In Table 1, the content of each position in the microarray is detailed.

Finally, the results obtained for each microarray could be observed, which are shown in FIG. 1 for M1 and in FIG. 2 for M2.

In Table 3, the microarray positions of each different fragment are indicated and hybridization results with DNA from M1, which are shown in FIG. 1, are summarized. It can be observed that, in every case, the families of spots (replicates of the same DNA fragment) had the same result and there always was total correlation between results obtained with 16S rDNA fragments and tRNA-synthase fragments. All positive controls showed hybridization and negative controls remained unmarked.

TABLE 3

Sample 1 (M1)

| | | Position in the microarray | | | | |
|---|---|---|---|---|---|---|
| Microorganism | 16S rDNA | R | tRNA-synthase 1 | R | tRNA-synthase 2 | R |
| *A. ferrooxidans* | A4-A6 | + | B7-B9 | + | C7-C9 | + |
| *A. thiooxidans* | A7-A9 | − | / | / | / | / |
| *Acidiphilium* spp. | E7-E9 | − | / | / | / | / |
| *Acidianus* spp. | C1-C3 | − | / | / | / | / |
| *Leptospirillum* spp. | C4-C6 | + | C10-C12 | + | E4-E6 | + |
| *Sulfobacillus* spp. | D4-D6 | − | / | / | / | / |
| *Ferroplasma* spp. | D1-D3 | + | D10-D12 | + | E10-E12 | + |
| *Metallosphaera* spp. | B4-B6 | − | / | / | / | / |
| *Sulfolobus* spp. | D7-D9 | − | A10-A12 | − | F4-F6 | − |
| *Thermoplasma* spp. | E1-E3 | − | F1-F3 | − | F10-F12 | − |
| Positive control | A1-A3 | + | / | / | / | / |
| Negative control | F7-F9 | − | B1-B3 | − | B10-B12 | − |

Legend:
(R): result; (+): positive; (−): negative; (/): does not exist.

The results show the presence of *A. ferrooxidans*, *Leptospirillum* spp., and *Ferroplasma* spp. in M1.

In Table 4, once again the microarray position of each different fragment is indicated and hybridization results with DNA obtained from M2, which are shown in FIG. 2, are summarized. As for M1, it is possible to observe that the new families of spots had always the same results, and correlation was kept between results obtained with 16S rDNA fragments and tRNA-synthase fragments. All positive controls showed hybridization and negative controls remained unmarked.

TABLE 4

Sample 2 (M2)

| | | Position in the microarray and result | | | | |
|---|---|---|---|---|---|---|
| Microorganism | 16S rDNA | R | tRNA-synthase | R | tRNA-synthase | R |
| *A. ferrooxidans* | A4-A6 | + | B7-B9 | + | C7-C9 | + |
| *A. thiooxidans* | A7-A9 | + | / | / | / | / |
| *Acidiphilium* spp. | E7-E9 | − | / | / | / | / |
| *Acidianus* spp. | C1-C3 | + | / | / | / | / |
| *Leptospirillum* spp. | C4-C6 | + | C10-C12 | + | E4-E6 | + |
| *Sulfobacillus* spp. | D4-D6 | − | / | / | / | / |
| *Ferroplasma* spp. | D1-D3 | + | D10-D12 | + | E10-E12 | + |
| *Metallosphaera* spp. | B4-B6 | + | / | / | / | / |
| *Sulfolobus* spp. | D7-D9 | + | A10-A12 | + | F4-F6 | + |
| *Thermoplasma* spp. | E1-E3 | − | F1-F3 | − | F10-F12 | − |
| Positive control | A1-A3 | + | / | / | / | / |
| Negative control | F7-F9 | − | B1-B3 | − | B10-B12 | − |

Legend:
(R): result; (+): positive; (−): negative; (/): does not exist.

The results show the presence of *A. ferrooxidans*, *A. thiooxidans*, *Acidianus* spp., *Leptospirillum* spp., *Ferroplasma* spp., *Metallosphaera* spp. and *Sulfolobus* spp. in sample 2 (M2).

List of Sequences.
Sequence No.: 1
Length: 100
Type: DNA
Microorganism: *Acidiphilium* spp.
Category: 16S rDNA
Sequence:
ACA CAC GTG CTA CAA TGG CGG TGA CAG TGG GAA GCC AAG CAG CGA TGC TGA GCT GAT CCT GAA AAG CCG TCT CAG TTC GGA TTG CAC TCT GCA ACT CGGG Sequence No.: 2
Length: 100
Type: DNA
Microorganism: *Leptospirillum* spp.
Category: 16S rDNA
Sequence:
ACG CAG CAA CGC CGC GTG TGG GAA GAA GGC CTT CGG GTC GTA AAC CAC TTT TAC TCG GGA CGA AAA AGG GAT ATC AAA TAA ATA TCC CCG ATG ACG GTAC Sequence No.: 3
Length: 100
Type: DNA
Microorganism: *Leptospirillum* spp.
Category: Isoleucyl-tRNA-synthase
Sequence:
TAT GGT GTC CAA ACT GCG AAA CAG CAC TCG CCC GAT GCG GAA GTC GAG TAT GAG CCC CAT TCT TCG ACA TCA GCT ACT GTC CTC TTT CCT GAA GTC CCGG Sequence No.: 4
Length: 100
Type: DNA
Microorganism: *Leptospirillum* spp.
Category: Threonyl-tRNA-synthase
Sequence:
CCT TTT CAT ATC CTG ATT ITT CGG GAA AGC GTC CAG AGC TAC CGG GAC CTT CCC ATC CGG TTG TCG GAA CTG GGA ACC GTC TAC CGG TAT GAA CGT TCGG Sequence No.: 5
Length: 100
Type: DNA
Microorganism: *Leptospirillum* spp.
Category: Glutamyl- and glutaminyl-tRNA-synthase
Sequence:
TGA GGC GAT CGC CGC TAT CCT CGA CGG AAT GCG CTG GCT CGA TTT GAG TTG GGA TGA GGG TCC CAT CTA CCA GAC CAG TCG TCT GGA ACG CTA CCG GGAG Sequence No.: 6
Length: 100
Type: DNA
Microorganism: *Leptospirillum* spp.
Category: Alanyl-tRNA-synthase
Sequence:
GAC GAA GCG GCC TCC CTT TGG CAG AGC GTT GCG GGT GTC GAT CCC TCC CGA ATC GTT CGA CTC GGA GAA AAG GAC AAT TTC TGG CAG ATG GGA AAC ACCG Sequence No.: 7
Length: 100
Type: DNA
Microorganism: *Leptospirillum* spp.
Category: Histidyl-tRNA-synthase
Sequence:
AGA AGG CCT TCG TCT CGG CCG AAA GAG AAG GCG CCC GCT ACA TCG GAC TCG CCG GTG AAA GCG AAC GCT CAG ACG GAA CCT TGA CCA TCA AGG ATC TGAA Sequence No.: 8
Length: 100
Type: DNA
Microorganism: *Leptospirillum* spp.
Category: Methionyl-tRNA-synthase
Sequence:
CCG AGG CGG TGC GCC CCG AGT CCC GCT ACA ACG AGG TCA TGG GTT TCC TCA GGA AGC CTC TGG GGG ACC TCT GCA TCT CCC GCC CCA AGA GCC GGG TTC C Sequence No.: 9
Length: 100
Type: DNA
Microorganism: *Leptospirillum* spp.
Category: Aspartyl-tRNA-synthase
Sequence:
GGT GGG GAC ATC GGA GGA GGT CTC GGA GAG CCT TCG ACT GAO TTA TCG CTA CCT CGA CAT GCG TTC CCC CCG GCT TCT GGA GGC ACT GAG GTT CCG CTCG Sequence No.: 10
Length: 100
Type: DNA
Microorganism: *Leptospirillum* spp.
Category: Phenylalanyl-tRNA-synthase
Sequence:
GGA TTC CAG GAG ATT CTC TCG AAT ATC CTG ACA TCG ATC GAA AAG GAC ACG ACA GAC CTC GGA CGT CCT TCG GAC ACG ACG GTC GAA ATC GAC AAC CCCG Sequence No.: 11
Length: 100
Type: DNA
Microorganism: *Sulfobacillus* spp.
Category: 16S rDNA
Sequence:
GGG TGC GTA GGC GGT GTT GTG GGT CTG AGG TGA AAG GTC GGG GCT CAA CCC TGA GAA TGC CTT GGA AAC TGC AAG ACT TGA GTG CTG GAG AGG CAA GGGG Sequence No.: 12
Length: 100
Type: DNA
Microorganism: *Acidithiobacillus* spp. no (*ferrooxidans, thiooxidans*)
Category: 16S rDNA
Sequence:
CGC GTG GAT GAA GAA GGC CTT CGG GTT GTA AAG TCC TTT CGT GGG GGA CGA AAA GGT GGT TCC TAA TAC GAG CTG CTG TTG ACG TGA ACC CAA GAA GAAG Sequence No.: 13
Length: 100
Type: DNA
Microorganism: *Acidithiobacillus* spp.
Category: 16S rDNA
Sequence:
ACG AAA AGG CGG GTC CTA ATA CGA TCT GCT GTT GAC GTG AAC CCA AGA AGA AGC ACC GGC TAA CTC CGT GCC AGC AGC CGC GGT AAT ACG GGG GGT GCAA Sequence No.: 14
Length: 100
Type: DNA
Microorganism: *Acidithiobacillus ferrooxidans*
Category: 16S rDNA
Sequence:
GTA ATG CGT AGG AAT CTG TCT TTT AGT GGG GGA CAA CCC AGG GAA ACT TGG GCT AAT ACC GCA TGA GCC CTG AGG GGG AAA GCG GGG GAT CTT CGG ACCT Sequence No.: 15
Length: 100
Type: DNA
Microorganism: *Acidithiobacillus ferrooxidans*
Category: 16S rDNA
Sequence:
CCG CAT GAG CCC TGA GGG GGA AAG CGG GGG ATC TTC GGA CCT CGC GCT AAG AGA GGA GCC TAC GTC CGA TTA GCT AGT TGG CGG GGT AAA GGC CCA CCAA Sequence No.: 16
Length: 100
Type: DNA
Microorganism: *Acidithiobacillus ferrooxidans*
Category: 16S rDNA
Sequence:
CCG CAT GAG CCC TGA GGG GGA AAG CGG GGG ATC TTC GGA CCT CGC GCT AAG AGA GGA GCC TAC GTC CGA TTA GCT AGT TGG CGG GGT AAA GGC CCA CCAA Sequence No.: 17
Length: 100
Type: DNA
Microorganism: *Acidithiobacillus ferrooxidans*
Category: 16S rDNA
Sequence:
ACT AGA TGT TTG GTG CCT AGC GTA CTG AGG TCG TAG CTA ACG CGA TAA GTA TTC CGC CTG GGA AGT ACG GCC GCA AGG TTA AAA CTC AAA GGA ATT GACG Sequence No.: 18
Length: 100
Type: DNA
Microorganism: *Acidithiobacillus ferrooxidans*
Category: Glutamyl- and glutaminyl-tRNA-synthase
Sequence:
ACC GGA TCG GGG GGG CGA TCA CGG CCT CTA CCG GCA GAT GCA GCG CAT GGC CGT CTA TCG GGA AGT GCT GTG CGC ATT TGC AGT CCA GTG GAA AGG CCTA Sequence No.: 19
Length: 100
Type: DNA
Microorganism: *Acidithiobacillus ferrooxidans*
Category: Alanyl-tRNA-synthase
Sequence:
GGA GTA TTT TGT GGA ACA GGG GCA TCA GAT CGT GCC CTC CAG CCC CCT GAT CCC TCG TAA CGA TCC GAC CCT GCT GTT TAC CAA TGC CGG TAT GGT GCCC Sequence No.: 20
Length: 100
Type: DNA
Microorganism: *Acidithiobacillus ferrooxidans*
Category: Isoleucyl-tRNA-synthase
Sequence:
TCC GAC ACC ATC CTC CAG CAA CTG GGC GAC AGC TAC CGG CGC ATC CGT AAT ACG GCC CGC TAT ATG CTG GGC AAC ACC CAC GAC TTT AAT CCA GCC ACGG Sequence No.: 21
Length: 100
Type: DNA
Microorganism: *Acidithiobacillus ferrooxidans*
Category: Phenylalanyl-tRNA-synthase
Sequence:
TGC CCA TGA CGC GGG GAC CGC AGG CAG CCA
CTT TAC GCA GTG TTT TGC AGG CGC GTG ATT ATC
ATG AGG TGA TCA CCT ACA GTT TTA TCT CCC GTC
AGGC Sequence No.: 22
Length: 100
Type: DNA
Microorganism: *Acidithiobacillus ferrooxidans*
Category: Histidyl-tRNA-synthase
Sequence:
GGC ATT ACC CCG CCG TTC GTG CCG CCC TGG ATG
ACC TGC AGC GCG TAT GGT CGG TAT TAC GGG CAC
GTT ATC CAG ACC TGG CGA TTC AAT GCG ATC TCTC Sequence No.: 23
Length: 100
Type: DNA
Microorganism: *Acidithiobacillus ferrooxidans*
Category: Methionyl-tRNA-synthase
Sequence:
AGC ACT GGT GCG CGG CCC ACG GCC GCA ATT TGG
CCG ATT ACT GGG GCC CGG ATT CCG CTG CCG AGA
TCT ACC ATT TTA TCG GCA AGG ACA TCA TTT ATTT Sequence No.: 24
Length: 100
Type: DNA
Microorganism: *Acidithiobacillus ferrooxidans*
Category: Aspartyl-tRNA-synthase
Sequence:
CTT CGG CGT CGA TCG CCC CGA TCT ACG CAA TCC
GCT GGA ACT GAC AGA GCT CAC CGA TCT CAT GCG
CGC GGT GGA CTT CAA AGT GTT CCG CGA AGC
CGCC Sequence No.: 25
Length: 100
Type: DNA
Microorganism: *Acidithiobacillus ferrooxidans*
Category: Threonyl-tRNA-synthase
Sequence:
TAT GAG GGC AAG TTT CCA GTC TGG CTC GCT CCG
GTA CAG GCC GTG GTG CTG CCT ATC AGC GAG CAT
TAC TCG GAA TAC GCC GAG TCG GTA AGT GAC GTAT Sequence No.: 26
Length: 100
Type: DNA
Microorganism: *Acidithiobacillus ferrooxidans*
Category: Leucyl-tRNA-synthase
Sequence:
GAC AAC ATC GCC CAC ATG CGC GGG CAA TTG CAG
CGG CTG AGG CCT GTC TTA CGA CTG GTC GCG GGA
GTT CGC TAC CTG CAC GCC GGC ATT ATT ATC GCTG Sequence No.: 27
Length: 100
Type: DNA
Microorganism: *Acidithiobacillus thiooxidans*
Category: 16S rDNA
Sequence:
TAC CTG GGC TTG ACA TGG ATC GGG AAT CCT GCA
GAG ATG CGG GAG TGC CTT TCG GGG AGT CGG ATC
ACA GGT GCT GCA TGG CTG TCG TCA GCT TCG
TGTC Sequence No.: 28
Length: 100
Type: DNA
Microorganism: Acidianus spp.
Category: 16S rDNA
Sequence:
ACG TGG TCA ACC TAA CCT CGG GAC TTG GAT ACC
TCC GGG AAA CTG GAG CTA ATC CAA GAT AGG CAA
AGG AAT CTG GAA CGA TCC ITT GCT TAA AGG CCTC Sequence No.: 29
Length: 100
Type: DNA
Microorganism: *Ferroplasma* spp.
Category: 16S rDNA
Sequence:
AAG GGA TAA CTT CGG GAA ACT GAA GGT AAT ACC
TTA TAA TTG CTT AAA ACT GGA ATG TTT TTG CAA
TAA AAG TTA CGA CGC TCA AGG ATG AGT CTG
CGAC Sequence No.: 30
Length: 100
Type: DNA
Microorganism: *Ferroplasma* spp.
Category: Glutamyl- and glutaminyl-tRNA-synthase
Sequence:
TTC AGT TAA CCT TGA AAA ATT CGA TAA GAT GAT
TTC AGG CCA TTA CTC CGA GGG TGA AGC AGC ACT
GGT AAT GAA AAC GGA CAT AAA TCA CCC GAA
TCCC Sequence No.: 31
Length: 100
Type: DNA
Microorganism: *Ferroplasma* spp.
Category: Alanyl-tRNA-synthase
Sequence:
AGA GGG CAC TAA GTA TTC CAT GAT GCC GCT AAA
AAT TGT TGA TAC AGG TTA CGG ATT GGA AAG GCT
TGT GTG GCT TTC TAC AGG CAC GCC CAC AGT TTAC Sequence No.: 32
Length: 100
Type: DNA
Microorganism: *Ferroplasma* spp.
Category: Isoleucyl-tRNA-synthase
Sequence:
ATA ATA GTG TTC CAT GGA AAG ATA AAT TTG TCA
TGG ATG TTA ATC CCG ATA TAA TCG GAT ACT TAA
AGG AAA ATA ACC TTC TAT TTA AAA GCC AGA AAAT Sequence No.: 33
Length: 100
Type: DNA
Microorganism: *Ferroplasma* spp.
Category: Phenylalanyl-tRNA-synthase
Sequence:
TGA CAA AAT GGT GCC TGT AAT ACT TGA CAG CAA
GGA AGA TGT AAT GTC AAT GCC CCC CAT AAT AAA
TGG GCT GAA ATC TAA AAT TGG AAA TAA TAC ATCA Sequence No.: 34
Length: 100
Type: DNA
Microorganism: *Ferroplasma* spp.
Category: Histidyl-tRNA-synthase
Sequence:
CTG ATG CAG AAA TTG TTG GAT TGG CTT CAA GCA
TTC TTG ATT ACC TTG GTT TAT CCG GGG TAT ATG
AAA TTA ACA TTA ATG ACA GAT TTT TGA TGG AATA Sequence No.: 35
Length: 100
Type: DNA
Microorganism: *Ferroplasma* spp.
Category: Methionyl-tRNA-synthase
Sequence:
AAA GGA TGT AGA TGA ATT TTT TAT TAA CCT GCT GGA AAA AGG ATA CCT TGT AAA ACG CTA TAT GAT ATC ACC ATT CTG CGT TGA AAT CAA TAA ATT CATG Sequence No.: 36
Length: 100
Type: DNA
Microorganism: *Ferroplasma* spp.
Category: Aspartyl-tRNA-synthase
Sequence:
CAG TCA CCC CAG CTC TAT AAG GAA ATT CTT ATA TCA TCA GGG TTT GAT AAA GTA TTC GAA GTA GGG CCT GCA TTT CGG GCT GAA AAG GAA AAC ACT GTAA Sequence No.: 37
Length: 100
Type: DNA
Microorganism: *Ferroplasma* spp.
Category: Threonyl-tRNA-synthase
Sequence:
TAT GAA AGA ATT GAA TGA AAA AAG CGG GTG GGA AGA GGT ATG GAC CGC ACA TGC TTT CAA AGA CAT TAT ATG GAA ACA ATC TGG ACA TTA TTA TAA GTAT Sequence No.: 38
Length: 100
Type: DNA
Microorganism: *Ferroplasma* spp.
Category: Leucyl-tRNA-synthase
Sequence:
AAA AAT ATG GCT GTA ATT TTT TAT GAA ACA ACA AGG AAA GCT GTT ACA AGG TCT GGC TCC AGG GTT ATA GTG GCA GTA TTA AAA GAC CAG TGG TTC ATTG Sequence No.: 39
Length: 100
Type: DNA
Microorganism: *Ferroplasma* spp.
Category: Valyl-tRNA-synthase
Sequence:
GGA ATC TGA CAT AAA AGC CAG ATG AAA CTG TCA ATG GCA GCA CCA CTG GAC ATT TAC GTA AAA TTG CAC GGA GCC ATG CTA AAT ATT ATA TCT CCT GAGC Sequence No.: 40
Length: 100
Type: DNA
Microorganism: *Metallosphaera* spp.
Category: 16S rDNA
Sequence:
TGC GGG AAA CCG TGA GGG CGT TAC CCC TAG TGC CCT CGC AAG AGG GCT TTT CTC CAC TCC AGA AAG GTG GAG GAA TAA GCG GGG GGC AAG ACT GGT GTCA Sequence No.: 41
Length: 100
Type: DNA
Microorganism: *Sulfolobus* spp.
Category: 16S rDNA
Sequence:
GGA GGG AGA TAA CCC CGG GAA ACT GGG GAT AAT CTC CCA TAG GCG AGG AGT CCT GGA ACG GTT CCT CGC TGA AAG GCT CAT GGG CTA TTC CCC GCT CATG Sequence No.: 42
Length: 100
Type: DNA
Microorganism: *Sulfolobus* spp.
Category: Glutamyl- and glutaminyl-tRNA-synthase
Sequence:
AGA TCC AAT AGC TAA GAG ACT AAT GTT TGT AAA AGA TCC AAA GGA GTT TAT CAT CGA GCT ACC AGA ACC AAT AAA GGC TAA AAT ACC ATA TAA TCC CTCT Sequence No.: 43
Length: 100
Type: DNA
Microorganism: *Sulfolobus* spp.
Category: Alanyl-tRNA-synthase
Sequence:
AAA ACC CAT AGA TGA ACA TTT AGC AAA GCA ATT AGG ACT TGA TTT GAA GTA TGT AGA TGA AGA ACT AAC AAG AGC TGC TAG AGT ATT TCA GGT ATT TGAT Sequence No.: 44
Length: 100
Type: DNA
Microorganism: *Sulfolobus* spp.
Category: Isoleucyl-tRNA-synthase
Sequence:
ATT GGT GTT CTA GAT GTG AGA CCA CAT TAG CGG ACT ATG AGG TTT CCG AGT ATA GAG ACT TAG AAG ATC CAT CCA TAT ATG TTA AAT TCA GGG TAA AAGG Sequence No.: 45
Length: 100
Type: DNA
Microorganism: *Sulfolobus* spp.
Category: Phenylalanyl-tRNA-synthase
Sequence:
TTT ATT TTG ATT AAA AAT GAA AAG ATA CTT GAT AGT GAG TAT GTG AAA ATA CTT AAC CCA ATT ACA GTG GAA TAT AAT GCA GTA AGA AAT TCA CTA ATAC Sequence No.: 46
Length: 100
Type: DNA
Microorganism: *Sulfolobus* spp.
Category: Histidyl-tRNA-synthase
Sequence:
TAA GAA AAA CTA TGT ATG TAT TTA AAG ATA AGG CAG ATA GAG AAG TCG UT TAA GAC CTG AGA TTA CAC CTA GTA TAG TTA GAG ITT ATC TAA ACT CGTT Sequence No.: 47
Length: 100
Type: DNA
Microorganism: *Sulfolobus* spp.
Category: Methionyl-tRNA-synthase
Sequence:
TTT TTT GAT TTA TCA GAA TTT AAT GAT AAA ATA AGG GAT TGG ATT AGC AGT TCT AAT ACA ATG CCT GAT AAT GTT AAG TCT GTC GCA TTA AGC TGG GTTA Sequence No.: 48
Length: 100
Type: DNA
Microorganism: *Sulfolobus* spp.
Category: Aspartyl-tRNA-synthase
Sequence:
GAT ACA CCG TTT CAT TTA GCA GAA TTT ATT AGT ATG GAT GTA GAA ATG GCG ITT GCT GAT TAT AAC GAT GTA ATG CAA CTT TTA GAG AAA ATA TTA CATA Sequence No.: 49
Length: 100
Type: DNA
Microorganism: *Sulfolobus* spp.
Category: Leucyl-tRNA-synthase
Sequence:
AGA ATA CTG CGA AAA AAA TAG GTT TGG GTA TAG
ATT GGA GAA GAG AAT TTA CTA CAA TTG ACC CAA
TTT TTG AGA AAT TTG TAC AGT GGC AGT TTA GTAA Sequence No.: 50
Length: 100
Type: DNA
Microorganism: *Sulfolobus* spp.
Category: Valyl-tRNA-synthase
Sequence:
GCT AGA AGA TCT ATA AAA AGT ATG AAA TTC ATT
CCT CCT AGA ATG AAG TAT TAC TTT GAG GAT TGG
ATA AAT AGT TTA GAA TGG GAA TGG AAT ATG ATTA Sequence No.: 51
Length: 100
Type: DNA
Microorganism: *Thermoplasma* spp.
Category: 16S rDNA
Sequence:
ATC TCC TGG GCT ACA CGC GCG CTA CAA AGG GCG
GGA CAA TGG GCT CCG ACA CCG AAA GGT GAA
GGT AAT CTC GAA ACC CGT CCG TAG TTC GGA TTG
AGGG Sequence No.: 52
Length: 100
Type: DNA
Microorganism: *Thermoplasma* spp.
Category: Glutamyl- and glutaminyl-tRNA-synthase
Sequence:
CGG CCA TAT GTA TGT CTG CAC CTG CCC CAG GGA
GGA GTT CAA GAA GAG GAA GCT AGA ATC AAT ACC
ATG CAA AGA TCG CGA TAA CCC TCC TGA AAC
CAAT Sequence No.: 53
Length: 100
Type: DNA
Microorganism: *Thermoplasma* spp.
Category: Alanyl-tRNA-synthase
Sequence:
AAC TCA TCA GTT TCT GAT ATA GAC GAA GAA TTT
CTG TCA GAG GTT GTA AAG GCC TCG GTT ATG AAA
GAG CCA TAC GAA GAA TCA TTC GTC ATT TCG
CAAC Sequence No.: 54
Length: 100
Type: DNA
Microorganism: *Thermoplasma* spp.
Category: Isoleucyl-tRNA-synthase
Sequence:
TGA TGG ACG AGA AGC TAG AAA GTG AGA TGG ATC
GTG CAT ATT CGG TCA TCG AAA CTG TGC GCA GAC
TCA GGC AGG AGA ACT CCA TAA AGG GCA GGC
AGCC Sequence No.: 55
Length: 100
Type: DNA
Microorganism: *Thermoplasma* spp.
Category: Phenylalanyl-tRNA-synthase
Sequence:
TGG AGA CAG CAT ACA TTA TAC GAC AGT GAG CAG
GAA CCA AAG GAT GCA AAC CTA CGA TGG AAT GGA
AGG AAC CGT CGA TTG GAT CAT CAA AAA CCA
TGAA Sequence No.: 56
Length: 100
Type: DNA
Microorganism: *Thermoplasma* spp.
Category: Histidyl-tRNA-synthase
Sequence:
GGA TGT TGA GAA GTT CAT ATT CAA AAC GGC AGA
GGA GGC TGC AGA GGC ATT CGG ITT CAG GCG AAT
AGA CTT TCC AAG TCT TGA GTA TCT TGA TCT TTAC Sequence No.: 57
Length: 100
Type: DNA
Microorganism: *Thermoplasma* spp.
Category: Methionyl-tRNA-synthase
Sequence:
CAA TGC TGA TGG GCT ATG GTG GTT TCA ACC TGC
CAT ACG ACA ITC CTG CTA ACG AAT ACC TGA CGT
TCA AAG GCC AGC AAT TCT CCA AGA GCA GAG
GGAT Sequence No.: 58
Length: 100
Type: DNA
Microorganism: *Thermoplasma* spp.
Category: Threonyl-tRNA-synthase
Sequence:
GTT ATA TAA AAG CAT TCA AGC TTC TGA ACA TTG
CCA GCG CGG TTT ACA AGC ACG ATG AGA GCA AGA
CCC TCG TAA GGA TAT ACG AAC CCG CCT TTC
CTGA Sequence No.: 59
Length: 100
Type: DNA
Microorganism: *Thermoplasma* spp.
Category: Valyl-tRNA-synthase
Sequence:
GAT GAC AAT GCG GTA GGT GAG GAC GAC ATC AAG
GAC GGG GAT ACG GAC AAG GTC ACC ATA GAG GAG
TAT ACC GCC ATA TTC TTC CGT GGA AAG TCC TTCG Sequence No.: 60
Length: 100
Type: DNA
Microorganism: Wenelen (DSM 16786)
Category: Specific region for Wenelen
Sequence:
CCA ATA CTG GAC GTC ACC TAT ATT ATT CGC CAG
CGA CAG CCG TAA AGG TTT TCC GGG CAT CCT ACA
GGC CTG GCC CAT CGC TTC CCG CGA CAA GTG
CGGC Sequence No.: 61
Length: 100
Type: DNA
Microorganism: Wenelen (DSM 16786)
Category: Specific region for Wenelen
Sequence:
CCC CAC CAA GCC CCC AAT CGG GTC CGA CTG GCG
AGG AGA CCA CCG ATG AAT AAG CAA CCT TGG ATC
TCT TAG GAG GGC CAC AAC TCA TGA AAA AAT
CGCG Sequence No.: 62
Length: 100
Type: DNA Microorganism: Wenelen (DSM 16786)
Category: Specific region for Wenelen
Sequence:
CCG ACA CCC TGA GCT GCG TGA ACC GTC GCA CGG
GGA ACG TCA TTT CGG CGC CAA TTC ACG CCT ATG
TCG TGA GTA GCG GCG GGC ATG GCG GTG TTC
CCGG
Sequence No.: 63
Length: 100
Type: DNA
Microorganism: Wenelen (DSM 16786)
Category: Specific region for Wenelen
Sequence:
CAC CTG TAC GTA TGA AAA CCC CTA CGC CCC CAA
TCG CGG AGA TTG GCT GGC GGC CTA CTG TAA TAA
CGG CTG CGG GTA TAC GGG TTG TAT GGG TCA
AGAG
Sequence No.: 64
Length: 100
Type: DNA
Microorganism: Wenelen (DSM 16786)
Category: Specific region for Wenelen
Sequence:
CAA CGC CGG TCC CGC GCC GAT TAT CCA GGT CAT
CAA CAC GGC CCA TCG GGA ACT GAA TAT TGG CGT
CTA TTA CCT GGA TGA CCG CAA GGT GCT TCG
CGCC
Sequence No.: 65
Length: 100
Type: DNA
Microorganism: Wenelen (DSM 16786)
Category: Specific region for Wenelen
Sequence:
GAA GCC GAG ATG CTA TCC CAG GCC CTG CGC CGG
GTT GTC ATT CGC GGA CAC CTG AAT GAT GTA TAT
GAT CCG ATA ACG AAG TTT GAT TAT CAA GGG GTTG
Sequence No.: 66
Length: 100
Type: DNA
Microorganism: Wenelen (DSM 16786)
Category: Specific region for Wenelen
Sequence:
TCC ACC TAG CCA GGG CAT CGC GTC TCT GAT GAT
TGC CGG TAT CAT GGA GCG TTT GGG GCT AGG CGA
TGT TGA CCC CCT TAG TGC CGA ATT GAT ACA CGGC
Sequence No.: 67
Length: 100
Type: DNA
Microorganism: Wenelen (DSM 16786)
Category: Specific region for Wenelen
Sequence:
ACC TCG CGA AGA GCG TGA CGG TGG AGT AAT GGG
GCG GTT CGG TGT GCC GGG TGT GTT CGC AGG TAA
TAA AGT TTG CTC ATG GGT AAT AAA GTT TGG ACAT
Sequence No.: 68
Length: 100
Type: DNA
Microorganism: Wenelen (DSM 16786)
Category: Specific region for Wenelen
Sequence:
TGC CGG GCC TTG GGC TAT TGC AGC TGA CGT CGC
CCG GCA TCT GGG CGT TGT GAA GGT TAA GGG CAC
CGT TTA CCG CTG ACG CGA ACA CAA AGG GTC
TCCC
Sequence No.: 69
Length: 100
Type: DNA
Microorganism: Wenelen (DSM 16786)
Category: Specific region for Wenelen
Sequence:
GTT TGA GAC CCA AGA GGG CTT TGA GAT AGC GAA
ACG CAT GGT TCT GGG TGA CCA ACA TGA TGA CGG
CCC ACT CCA CTA ACC CGG ATT GGC TCT GCC CCGC
Sequence No.: 70
Length: 100
Type: DNA
Microorganism: Wenelen (DSM 16786)
Category: Valyl-tRNA-synthase
Sequence:
GGT GGC GCG AAT GAT CAT GAT GGG TCT GCG CTT
CAT GGA CGA TGT GCC ATT CCA TGA AGT CTA TGT
CCA CGG TCT GGT GCG CGA TGC CGA GGG CCA
GAAG

What is claimed is:

1. A DNA array for the detection and identification of biomining microorganisms, the array consisting of:
   a plurality of identifier DNA fragments, each identifier DNA fragment consisting of 50 to 100 contiguous nucleotides selected from one of SEQ ID NOS: 1-70 or the complement sequences thereof, wherein at least one identifier DNA fragment consists of 50 to 100 contiguous nucleotides of SEQ ID NO:60 or the full complement sequence thereof;
   one or more positive control DNA fragments, each positive control DNA fragment consisting of 50 to 100 contiguous nucleotides of a 16S rDNA sequence or nucleotide sequence encoding tRNA synthase from a biomining microorganism, the biomining microorganism consisting of a microorganism that is both acidophilic and chemolithotrophic; and
   one of more negative control DNA fragments, each negative control DNA fragment consisting of 50 to 100 contiguous nucleotides of a 16S rDNA sequence or nucleotide sequence encoding tRNA synthase from a microorganism that is not a biomining microorganism; deposited on an array support.

2. The array of claim 1, wherein the identifier DNA fragment consists of 50 to 70 nucleotides.

3. A DNA array for the detection and identification of biomining microorganisms, the array consisting of:
   a plurality of identifier DNA fragments, each identifier DNA fragment consisting of 50 to 100 contiguous nucleotides of a 16S rDNA sequence or nucleotide sequence encoding tRNA synthase from a biomining microorganism, the biomining microorganism consisting of a microorganism that is both acidophilic and chemolithotrophic, wherein at least one identifier DNA fragment consists of 50 to 100 contiguous nucleotides of SEQ ID NO: 60 or the full complement sequence thereof;
   one or more positive control DNA fragments, each positive control DNA fragment consisting of 50 to 100 contiguous nucleotides of a 16S rDNA sequence or nucleotide sequence encoding tRNA synthase from a biomining microorganism; and
   one of more negative control DNA fragments, each negative control DNA fragment consisting of 50 to 100 contiguous nucleotides of a 16S rDNA sequence or nucleotide sequence encoding tRNA synthase from a microorganism that is not a biomining microorganism; deposited on an array support.

4. The array of claim 3, wherein the identifier DNA fragment consists of 50 to 70 nucleotides.

* * * * *

UNITED STATES PATENT AND TRADEMARK OFFICE
CERTIFICATE OF CORRECTION

PATENT NO.        : 7,915,031 B2
APPLICATION NO.   : 11/601516
DATED             : March 29, 2011
INVENTOR(S)       : Badilla Ohlbaum et al.

It is certified that error appears in the above-identified patent and that said Letters Patent is hereby corrected as shown below:

Col. 12, line 33: "ATT ITT CGG" should read --ATT TTT CGG--

Col. 13, line 19: "ACT GAO TTA" should read --ACT GAC TTA--

Col. 18, line 47: "TCG UT TAA" should read --TCG CTT TAA--

Col. 18, line 48: "GAG ITT ATC" should read --GAG TTT ATC--

Col. 18, line 66: "GCG ITT GCT" should read --GCG TTT GCT--

Col. 20, line 14: "CGG ITT CAG" should read --CGG TTT CAG--

Col. 20, line 23: "ACA ITC CTG" should read --ACA TTC CTG--

Signed and Sealed this
Fifth Day of June, 2012

David J. Kappos
*Director of the United States Patent and Trademark Office*

```
                              SEQUENCE LISTING

<160> NUMBER OF SEQ ID NOS: 70

<210> SEQ ID NO 1
<211> LENGTH: 100
<212> TYPE: DNA
<213> ORGANISM: Acidiphilium spp.

<400> SEQUENCE: 1
acacacgtgc tacaatggcg gtgacagtgg gaagccaagc agcgatgctg agctgatcct     60
gaaaagccgt ctcagttcgg attgcactct gcaactcggg                          100

<210> SEQ ID NO 2
<211> LENGTH: 100
<212> TYPE: DNA
<213> ORGANISM: Leptospirillum spp.

<400> SEQUENCE: 2
acgcagcaac gccgcgtgtg ggaagaaggc cttcgggtcg taaaccactt ttactcggga     60
cgaaaaaggg atatcaaata aatatccccg atgacggtac                          100
```

<210> SEQ ID NO 3
<211> LENGTH: 100
<212> TYPE: DNA
<213> ORGANISM: Leptospirillum spp.

<400> SEQUENCE: 3
tatggtgtcc aaactgcgaa acagcactcg cccgatgcgg aagtcgagta tgagccccat    60
tcttcgacat cagctactgt cctctttcct gaagtcccgg                         100

<210> SEQ ID NO 4
<211> LENGTH: 100
<212> TYPE: DNA
<213> ORGANISM: Leptospirillum spp.

<400> SEQUENCE: 4 cctttcata tcctgatttt tcgggaaagc gtccagagct accgggacct tcccatccgg    60
ttgtcggaac tgggaaccgt ctaccggtat gaacgttcgg                         100

<210> SEQ ID NO 5
<211> LENGTH: 100
<212> TYPE: DNA
<213> ORGANISM: Leptospirillum spp.

<400> SEQUENCE: 5
tgaggcgatc gccgctatcc tcgacggaat gcgctggctc gatttgagtt gggatgaggg    60
tcccatctac cagaccagtc gtctggaacg ctaccgggag                         100

<210> SEQ ID NO 6
<211> LENGTH: 100
<212> TYPE: DNA
<213> ORGANISM: Leptospirillum spp.

<400> SEQUENCE: 6
gacgaagcgg cctcccttttg gcagagcgtt gcgggtgtcg atccctcccg aatcgttcga    60
ctcggagaaa aggacaattt ctggcagatg ggaaacaccg                         100

<210> SEQ ID NO 7
<211> LENGTH: 100
<212> TYPE: DNA
<213> ORGANISM: Leptospirillum spp.

<400> SEQUENCE: 7
agaaggcctt cgtctcggcc gaaagagaag gcgcccgcta catcggactc gccggtgaaa    60
gcgaacgctc agacggaacc ttgaccatca aggatctgaa                         100

<210> SEQ ID NO 8
<211> LENGTH: 100
<212> TYPE: DNA
<213> ORGANISM: Leptospirillum spp.

<400> SEQUENCE: 8
ccgaggcggt gcgccccgag tcccgctaca acgaggtcat gggtttcctc aggaagcctc    60
tgggggacct ctgcatctcc cgccccaaga gccgggttcc                         100

<210> SEQ ID NO 9
<211> LENGTH: 100
<212> TYPE: DNA
<213> ORGANISM: Leptospirillum spp.

<400> SEQUENCE: 9

```
ggtggggaca tcggaggagg tctcggagag ccttcgactg acttatcgct acctcgacat    60
gcgttccccc cggcttctgg aggcactgag gttccgctcg                         100

<210> SEQ ID NO 10
<211> LENGTH: 100
<212> TYPE: DNA
<213> ORGANISM: Leptospirillum spp.

<400> SEQUENCE: 10
ggattccagg agattctctc gaatatcctg acatcgatcg aaaggacac gacagacctc    60 ggacgtcctt cggacacgac ggtcgaaatc gacaaccccg                         100

<210> SEQ ID NO 11
<211> LENGTH: 100
<212> TYPE: DNA
<213> ORGANISM: Sulfobacillus spp.

<400> SEQUENCE: 11
gggtgcgtag gcggtgttgt gggtctgagg tgaaaggtcg gggctcaacc ctgagaatgc    60
cttggaaact gcaagacttg agtgctggag aggcaagggg                         100

<210> SEQ ID NO 12
<211> LENGTH: 100
<212> TYPE: DNA
<213> ORGANISM: Acidithiobacillus spp. no (ferrooxidans, thiooxidans)

<400> SEQUENCE: 12
cgcgtggatg aagaaggcct tcgggttgta aagtcctttc gtgggggacg aaaaggtggt    60
tcctaatacg agctgctgtt gacgtgaacc caagaagaag                         100

<210> SEQ ID NO 13
<211> LENGTH: 100
<212> TYPE: DNA
<213> ORGANISM: Acidithiobacillus spp.

<400> SEQUENCE: 13
acgaaaaggc gggtcctaat acgatctgct gttgacgtga acccaagaag aagcaccggc    60
taactccgtg ccagcagccg cggtaatacg gggggtgcaa                         100

<210> SEQ ID NO 14
<211> LENGTH: 100
<212> TYPE: DNA
<213> ORGANISM: Acidithiobacillus ferrooxidans

<400> SEQUENCE: 14
gtaatgcgta ggaatctgtc ttttagtggg ggacaaccca gggaaacttg gctaatacc    60 gcatgagccc tgagggggaa agcggggat cttcggacct                         100

<210> SEQ ID NO 15
<211> LENGTH: 100
<212> TYPE: DNA
<213> ORGANISM: Acidithiobacillus ferrooxidans

<400> SEQUENCE: 15
ccgcatgagc cctgaggggg aaagcggggg atcttcggac ctcgcgctaa gagaggagcc    60
tacgtccgat tagctagttg gcgggtaaa ggcccaccaa                         100

<210> SEQ ID NO 16
<211> LENGTH: 100
```

```
<212> TYPE: DNA
<213> ORGANISM: Acidithiobacillus ferrooxidans

<400> SEQUENCE: 16
ccgcatgagc cctgaggggg aaagcggggg atcttcggac ctcgcgctaa gagaggagcc      60
tacgtccgat tagctagttg gcggggtaaa ggcccaccaa                           100

<210> SEQ ID NO 17
<211> LENGTH: 100
<212> TYPE: DNA
<213> ORGANISM: Acidithiobacillus ferrooxidans

<400> SEQUENCE: 17
actagatgtt tggtgcctag cgtactgagg tcgtagctaa cgcgataagt attccgcctg      60
ggaagtacgg ccgcaaggtt aaaactcaaa ggaattgacg                           100

<210> SEQ ID NO 18
<211> LENGTH: 100
<212> TYPE: DNA
<213> ORGANISM: Acidithiobacillus ferrooxidans

<400> SEQUENCE: 18
accggatcgg gggggcgatc acggcctcta ccggcagatg cagcgcatgg ccgtctatcg      60
ggaagtgctg tgcgcatttg cagtccagtg gaaaggccta                           100

<210> SEQ ID NO 19
<211> LENGTH: 100
<212> TYPE: DNA
<213> ORGANISM: Acidithiobacillus ferrooxidans

<400> SEQUENCE: 19
ggagtatttt gtggaacagg ggcatcagat cgtgccctcc agcccctga tccctcgtaa       60 cgatccgacc ctgctgttta ccaatgccgg tatggtgccc                           100

<210> SEQ ID NO 20
<211> LENGTH: 100
<212> TYPE: DNA
<213> ORGANISM: Acidithiobacillus ferrooxidans

<400> SEQUENCE: 20
tccgacacca tcctccagca actgggcgac agctaccggc gcatccgtaa tacggcccgc      60
tatatgctgg gcaacaccca cgactttaat ccagccacgg                           100

<210> SEQ ID NO 21
<211> LENGTH: 100
<212> TYPE: DNA
<213> ORGANISM: Acidithiobacillus ferrooxidans

<400> SEQUENCE: 21
tgcccatgac gcggggaccg caggcagcca ctttacgcag tgttttgcag gcgcgtgatt      60
atcatgaggt gatcacctac agttttatct cccgtcaggc                           100

<210> SEQ ID NO 22
<211> LENGTH: 100
<212> TYPE: DNA
<213> ORGANISM: Acidithiobacillus ferrooxidans

<400> SEQUENCE: 22
ggcattaccc cgccgttcgt gccgccctgg atgacctgca gcgcgtatgg tcggtattac      60
gggcacgtta tccagacctg gcgattcaat gcgatctctc                           100
```

<210> SEQ ID NO 23
<211> LENGTH: 100
<212> TYPE: DNA
<213> ORGANISM: Acidithiobacillus ferrooxidans

<400> SEQUENCE: 23
agcactggtg cgcggcccac ggccgcaatt tggccgatta ctggggcccg gattccgctg        60
ccgagatcta ccattttatc ggcaaggaca tcatttattt                            100

<210> SEQ ID NO 24
<211> LENGTH: 100
<212> TYPE: DNA
<213> ORGANISM: Acidithiobacillus ferrooxidans

<400> SEQUENCE: 24
cttcggcgtc gatcgccccg atctacgcaa tccgctggaa ctgacagagc tcaccgatct        60
catgcgcgcg gtggacttca aagtgttccg cgaagccgcc                            100

<210> SEQ ID NO 25
<211> LENGTH: 100
<212> TYPE: DNA
<213> ORGANISM: Acidithiobacillus ferrooxidans

<400> SEQUENCE: 25
tatgagggca gtttccagt ctggctcgct ccggtacagg ccgtggtgct gcctatcagc        60
gagcattact cggaatacgc cgagtcggta agtgacgtat                            100

<210> SEQ ID NO 26
<211> LENGTH: 100
<212> TYPE: DNA
<213> ORGANISM: Acidithiobacillus ferrooxidans

<400> SEQUENCE: 26
gacaacatcg cccacatgcg cgggcaattg cagcggctga ggcctgtctt acgactggtc        60
gcgggagttc gctacctgca cgccggcatt attatcgctg                            100

<210> SEQ ID NO 27
<211> LENGTH: 100
<212> TYPE: DNA
<213> ORGANISM: Acidithiobacillus thiooxidans

<400> SEQUENCE: 27
tacctgggct tgacatggat cgggaatcct gcagagatgc gggagtgcct ttcggggagt        60
cggatcacag gtgctgcatg gctgtcgtca gcttcgtgtc                            100

<210> SEQ ID NO 28
<211> LENGTH: 100
<212> TYPE: DNA
<213> ORGANISM: Acidianus spp.

<400> SEQUENCE: 28
acgtggtcaa cctaacctcg ggacttggat acctccggga aactggagct aatccaagat        60
aggcaaagga atctggaacg atcctttgct taaaggcctc                            100

<210> SEQ ID NO 29
<211> LENGTH: 100
<212> TYPE: DNA
<213> ORGANISM: Ferroplasma spp.

<400> SEQUENCE: 29

-continued

```
aagggataac ttcgggaaac tgaaggtaat accttataat tgcttaaaac tggaatgttt    60
ttgcaataaa agttacgacg ctcaaggatg agtctgcgac                          100

<210> SEQ ID NO 30
<211> LENGTH: 100
<212> TYPE: DNA
<213> ORGANISM: Ferroplasma spp.

<400> SEQUENCE: 30
ttcagttaac cttgaaaaat tcgataagat gatttcaggc cattactccg agggtgaagc    60
agcactggta atgaaaacgg acataaatca cccgaatccc                          100

<210> SEQ ID NO 31
<211> LENGTH: 100
<212> TYPE: DNA
<213> ORGANISM: Ferroplasma spp.

<400> SEQUENCE: 31
agagggcact aagtattcca tgatgccgct aaaaattgtt gatacaggtt acggattgga    60
aaggcttgtg tggctttcta caggcacgcc cacagtttac                          100

<210> SEQ ID NO 32
<211> LENGTH: 100
<212> TYPE: DNA
<213> ORGANISM: Ferroplasma spp.

<400> SEQUENCE: 32
ataatagtgt tccatggaaa gataaatttg tcatggatgt taatcccgat ataatcggat    60
acttaaagga aataaccttt ctatttaaaa gccagaaaat                          100

<210> SEQ ID NO 33
<211> LENGTH: 100
<212> TYPE: DNA
<213> ORGANISM: Ferroplasma spp.

<400> SEQUENCE: 33
tgacaaaatg gtgcctgtaa tacttgacag caaggaagat gtaatgtcaa tgcccccat     60 aataaatggg ctgaaatcta aaattggaaa taatacatca                          100

<210> SEQ ID NO 34
<211> LENGTH: 100
<212> TYPE: DNA
<213> ORGANISM: Ferroplasma spp.

<400> SEQUENCE: 34
ctgatgcaga aattgttgga ttggcttcaa gcattcttga ttaccttggt ttatccgggg    60
tatatgaaat taacattaat gacagatttt tgatggaata                          100

<210> SEQ ID NO 35
<211> LENGTH: 100
<212> TYPE: DNA
<213> ORGANISM: Ferroplasma spp.

<400> SEQUENCE: 35
aaaggatgta gatgaatttt ttattaacct gctggaaaaa ggatacctto taaaacgcta    60 tatgatatca ccattctgcg ttgaaatcaa taaattcatg                          100

<210> SEQ ID NO 36
<211> LENGTH: 100
```

```
<212> TYPE: DNA
<213> ORGANISM: Ferroplasma spp.

<400> SEQUENCE: 36
cagtcacccc agctctataa ggaaattctt atatcatcag ggtttgataa agtattcgaa      60
gtagggcctg catttcgggc tgaaaaggaa aacactgtaa                          100

<210> SEQ ID NO 37
<211> LENGTH: 100
<212> TYPE: DNA
<213> ORGANISM: Ferroplasma spp.

<400> SEQUENCE: 37
tatgaaagaa ttgaatgaaa aaagcgggtg ggaagaggta tggaccgcac atgctttcaa      60
agacattata tggaaacaat ctggacatta ttataagtat                          100

<210> SEQ ID NO 38
<211> LENGTH: 100
<212> TYPE: DNA
<213> ORGANISM: Ferroplasma spp.

<400> SEQUENCE: 38
aaaaatatgg ctgtaatttt ttatgaaaca acaaggaaag ctgttacaag gtctggctcc      60 aggttatag tggcagtatt aaaagaccag tggttcattg                           100

<210> SEQ ID NO 39
<211> LENGTH: 100
<212> TYPE: DNA
<213> ORGANISM: Ferroplasma spp.

<400> SEQUENCE: 39
ggaatctgac ataaaagcca gatgaaactg tcaatggcag caccactgga catttacgta      60
aaattgcacg gagccatgct aaatattata tctcctgagc                          100

<210> SEQ ID NO 40
<211> LENGTH: 100
<212> TYPE: DNA
<213> ORGANISM: Metallosphaera spp.

<400> SEQUENCE: 40
tgcgggaaac cgtgagggcg ttacccctag tgccctcgca agagggcttt tctccactcc      60
agaaaggtgg aggaataagc gggggcaag actggtgtca                           100

<210> SEQ ID NO 41
<211> LENGTH: 100
<212> TYPE: DNA
<213> ORGANISM: Sulfolobus spp.

<400> SEQUENCE: 41
ggagggagat aaccccggga aactggggat aatctcccat aggcgaggag tcctggaacg      60
gttcctcgct gaaaggctca tgggctattc cccgctcatg                          100

<210> SEQ ID NO 42
<211> LENGTH: 100
<212> TYPE: DNA
<213> ORGANISM: Sulfolobus spp.

<400> SEQUENCE: 42
agatccaata gctaagagac taatgtttgt aaaagatcca aaggagttta tcatcgagct      60
accagaacca ataaaggcta aaataccata taatccctct                          100
```

<210> SEQ ID NO 43
<211> LENGTH: 100
<212> TYPE: DNA
<213> ORGANISM: Sulfolobus spp.

<400> SEQUENCE: 43
aaaacccata gatgaacatt tagcaaagca attaggactt gatttgaagt atgtagatga    60
agaactaaca agagctgcta gagtatttca ggtatttgat                         100

<210> SEQ ID NO 44
<211> LENGTH: 100
<212> TYPE: DNA
<213> ORGANISM: Sulfolobus spp.

<400> SEQUENCE: 44
attggtgttc tagatgtgag accacattag cggactatga ggtttccgag tatagagact    60
tagaagatcc atccatatat gttaaattca gggtaaaagg                         100

<210> SEQ ID NO 45
<211> LENGTH: 100
<212> TYPE: DNA
<213> ORGANISM: Sulfolobus spp.

<400> SEQUENCE: 45
tttattttga ttaaaaatga aaagatactt gatagtgagt atgtgaaaat acttaaccca    60
attacagtgg aatataatgc agtaagaaat tcactaatac                         100

<210> SEQ ID NO 46
<211> LENGTH: 100
<212> TYPE: DNA
<213> ORGANISM: Sulfolobus spp.

<400> SEQUENCE: 46
taagaaaaac tatgtatgta tttaaagata aggcagatag agaagtcgct ttaagacctg    60
agattacacc tagtatagtt agagtttatc taaactcgtt                         100

<210> SEQ ID NO 47
<211> LENGTH: 100
<212> TYPE: DNA
<213> ORGANISM: Sulfolobus spp.

<400> SEQUENCE: 47 tttttttgatt tatcagaatt taatgataaa ataagggatt ggattagcag ttctaataca    60
atgcctgata atgttaagtc tgtcgcatta agctgggtta                         100

<210> SEQ ID NO 48
<211> LENGTH: 100
<212> TYPE: DNA
<213> ORGANISM: Sulfolobus spp.

<400> SEQUENCE: 48
gatacaccgt ttcatttagc agaatttatt agtatggatg tagaaatggc gtttgctgat    60
tataacgatg taatgcaact tttagagaaa atattacata                         100

<210> SEQ ID NO 49
<211> LENGTH: 100
<212> TYPE: DNA
<213> ORGANISM: Sulfolobus spp.

<400> SEQUENCE: 49

-continued

```
agaatactgc gaaaaaaata ggtttgggta tagattggag aagagaattt actacaattg    60 acccaattt tgagaaattt gtacagtggc agtttagtaa                          100

<210> SEQ ID NO 50
<211> LENGTH: 100
<212> TYPE: DNA
<213> ORGANISM: Sulfolobus spp.

<400> SEQUENCE: 50
gctagaagat ctataaaaag tatgaaattc attcctccta gaatgaagta ttactttgag    60
gattggataa atagtttaga atgggaatgg aatatgatta                         100

<210> SEQ ID NO 51
<211> LENGTH: 100
<212> TYPE: DNA
<213> ORGANISM: Thermoplasma spp.

<400> SEQUENCE: 51
atctcctggg ctacacgcgc gctacaaagg gcgggacaat gggctccgac accgaaaggt    60
gaaggtaatc tcgaaacccg tccgtagttc ggattgaggg                         100

<210> SEQ ID NO 52
<211> LENGTH: 100
<212> TYPE: DNA
<213> ORGANISM: Thermoplasma spp.

<400> SEQUENCE: 52
cggccatatg tatgtctgca cctgccccag ggaggagttc aagaagagga agctagaatc    60
aataccatgc aaagatcgcg ataaccctcc tgaaaccaat                         100

<210> SEQ ID NO 53
<211> LENGTH: 100
<212> TYPE: DNA
<213> ORGANISM: Thermoplasma spp.

<400> SEQUENCE: 53
aactcatcag tttctgatat agacgaagaa tttctgtcag aggttgtaaa ggcctcggtt    60
atgaaagagc catacgaaga atcattcgtc atttcgcaac                         100

<210> SEQ ID NO 54
<211> LENGTH: 100
<212> TYPE: DNA
<213> ORGANISM: Thermoplasma spp.

<400> SEQUENCE: 54
tgatggacga gaagctagaa agtgagatgg atcgtgcata ttcggtcatc gaaactgtgc    60
gcagactcag gcaggagaac tccataaagg gcaggcagcc                         100

<210> SEQ ID NO 55
<211> LENGTH: 100
<212> TYPE: DNA
<213> ORGANISM: Thermoplasma spp.

<400> SEQUENCE: 55
tggagacagc atacattata cgacagtgag caggaaccaa aggatgcaaa cctacgatgg    60
aatggaagga accgtcgatt ggatcatcaa aaaccatgaa                         100

<210> SEQ ID NO 56
<211> LENGTH: 100
```

```
<212> TYPE: DNA
<213> ORGANISM: Thermoplasma spp.

<400> SEQUENCE: 56
ggatgttgag aagttcatat tcaaaacggc agaggaggct gcagaggcat tcggtttcag        60
gcgaatagac tttccaagtc ttgagtatct tgatctttac                             100

<210> SEQ ID NO 57
<211> LENGTH: 100
<212> TYPE: DNA
<213> ORGANISM: Thermoplasma spp.

<400> SEQUENCE: 57
caatgctgat gggctatggt ggtttcaacc tgccatacga cattcctgct aacgaatacc        60
tgacgttcaa aggccagcaa ttctccaaga gcagagggat                             100

<210> SEQ ID NO 58
<211> LENGTH: 100
<212> TYPE: DNA
<213> ORGANISM: Thermoplasma spp.

<400> SEQUENCE: 58
gttatataaa agcattcaag cttctgaaca ttgccagcgc ggtttacaag cacgatgaga        60
gcaagaccct cgtaaggata tacggaaccg cctttcctga                             100

<210> SEQ ID NO 59
<211> LENGTH: 100
<212> TYPE: DNA
<213> ORGANISM: Thermoplasma spp.

<400> SEQUENCE: 59
gatgacaatg cggtaggtga ggacgacatc aaggacgggg atacggacaa ggtcaccata        60
gaggagtata ccgccatatt cttccgtgga aagtccttcg                             100

<210> SEQ ID NO 60
<211> LENGTH: 100
<212> TYPE: DNA
<213> ORGANISM: Acidithiobacillus ferrooxidans

<400> SEQUENCE: 60
ccaatactgg acgtcaccta tattattcgc cagcgacagc cgtaaaggtt ttccgggcat        60
cctacaggcc tggcccatcg cttcccgcga caagtgcggc                             100

<210> SEQ ID NO 61
<211> LENGTH: 100
<212> TYPE: DNA
<213> ORGANISM: Acidithiobacillus ferrooxidans

<400> SEQUENCE: 61
ccccaccaag cccccaatcg ggtccgactg gcgaggagac caccgatgaa taagcaacct        60
tggatctctt aggagggcca caactcatga aaaaatcgcg                             100

<210> SEQ ID NO 62
<211> LENGTH: 100
<212> TYPE: DNA
<213> ORGANISM: Acidithiobacillus ferrooxidans

<400> SEQUENCE: 62
ccgacaccct gagctgcgtg aaccgtcgca cggggaacgt catttcggcg ccaattcacg        60
cctatgtcgt gagtagcggc gggcatggcg gtgttcccgg                             100
```

<210> SEQ ID NO 63
<211> LENGTH: 100
<212> TYPE: DNA
<213> ORGANISM: Acidithiobacillus ferrooxidans

<400> SEQUENCE: 63
cacctgtacg tatgaaaacc cctacgcccc caatcgcgga gattggctgg cggcctactg    60
taataacggc tgcgggtata cgggttgtat gggtcaagag                         100

<210> SEQ ID NO 64
<211> LENGTH: 100
<212> TYPE: DNA
<213> ORGANISM: Acidithiobacillus ferrooxidans

<400> SEQUENCE: 64
caacgccggt cccgcgccga ttatccaggt catcaacacg cccatcggg aactgaatat     60 tggcgtctat tacctggatg accgcaaggt gcttcgcgcc                        100

<210> SEQ ID NO 65
<211> LENGTH: 100
<212> TYPE: DNA
<213> ORGANISM: Acidithiobacillus ferrooxidans

<400> SEQUENCE: 65
gaagccgaga tgctatccca ggccctgcgc cgggttgtca ttcgcggaca cctgaatgat    60
gtatatgatc cgataacgaa gtttgattat caaggggttg                        100

<210> SEQ ID NO 66
<211> LENGTH: 100
<212> TYPE: DNA
<213> ORGANISM: Acidithiobacillus ferrooxidans

<400> SEQUENCE: 66
tccacctagc cagggcatcg cgtctctgat gattgccggt atcatggagc gtttggggct    60
aggcgatgtt gaccccctta gtgccgaatt gatacacggc                        100

<210> SEQ ID NO 67
<211> LENGTH: 100
<212> TYPE: DNA
<213> ORGANISM: Acidithiobacillus ferrooxidans

<400> SEQUENCE: 67
acctcgcgaa gagcgtgacg gtggagtaat ggggcggttc ggtgtgccgg gtgtgttcgc    60
aggtaataaa gtttgctcat gggtaataaa gtttggacat                        100

<210> SEQ ID NO 68
<211> LENGTH: 100
<212> TYPE: DNA
<213> ORGANISM: Acidithiobacillus ferrooxidans

<400> SEQUENCE: 68
tgccgggcct tgggctattg cagctgacgt cgcccggcat ctgggcgttg tgaaggttaa    60
gggcaccgtt taccgctgac gcgaacacaa agggtctccc                        100

<210> SEQ ID NO 69
<211> LENGTH: 100
<212> TYPE: DNA
<213> ORGANISM: Acidithiobacillus ferrooxidans

<400> SEQUENCE: 69

-continued

```
gtttgagacc caagagggct ttgagatagc gaaacgcatg gttctgggtg accaacatga      60
tgacggccca ctccactaac ccggattggc tctgccccgc                           100

<210> SEQ ID NO 70
<211> LENGTH: 100
<212> TYPE: DNA
<213> ORGANISM: Acidithiobacillus ferrooxidans

<400> SEQUENCE: 70
ggtggcgcga atgatcatga tgggtctgcg cttcatggac gatgtgccat tccatgaagt      60
ctatgtccac ggtctggtgc gcgatgccga gggccagaag                           100
```